US006988100B2

(12) United States Patent
Jackson et al.

(10) Patent No.: US 6,988,100 B2
(45) Date of Patent: Jan. 17, 2006

(54) METHOD AND SYSTEM FOR EXTENDING THE PERFORMANCE OF A WEB CRAWLER

(75) Inventors: Jared J. Jackson, San Jose, CA (US); Jussi P. Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 09/775,411

(22) Filed: Feb. 1, 2001

(65) Prior Publication Data

US 2002/0103823 A1   Aug. 1, 2002

(51) Int. Cl.
G06F 17/30 (2006.01)
(52) U.S. Cl. ............................................. 707/10; 707/2
(58) Field of Classification Search ................ 707/1–4, 707/10, 104.1, 217–219, 201–202
See application file for complete search history.

(56) References Cited

U.S. PATENT DOCUMENTS

| | | | | |
|---|---|---|---|---|
| 6,351,467 B1 * | 2/2002 | Dillon | ......................... | 370/432 |
| 6,377,984 B1 * | 4/2002 | Najork et al. | ................ | 709/217 |
| 6,418,441 B1 * | 7/2002 | Call | ............................ | 707/10 |
| 6,523,022 B1 * | 2/2003 | Hobbs | ........................... | 707/3 |
| 6,601,020 B1 * | 7/2003 | Myers | ......................... | 702/186 |
| 2001/0037361 A1 * | 11/2001 | Croy | ........................... | 709/203 |
| 2002/0038350 A1 * | 3/2002 | Lambert et al. | ............. | 709/217 |
| 2002/0099697 A1 * | 7/2002 | Jensen-Grey | .................. | 707/3 |
| 2003/0191737 A1 * | 10/2003 | Steele et al. | .................... | 707/1 |

OTHER PUBLICATIONS

U.S. Appl. No. 09/607,370, filed Jun. 30, 2000, Kraft et al.

* cited by examiner

Primary Examiner—Safet Metjahic
Assistant Examiner—Brian Goddard
(74) Attorney, Agent, or Firm—Jose Gutman; Fleit, Kain, Gibbons, Gutman, Bongini & Bianco P.L.

(57) ABSTRACT

A proxy engine (108), in communication with a web crawler (100), extends the performance of the web crawler (100) by modifying hyperlink requests and creating synthetic hyperlink requests from data received from a web site (104). The proxy engine (108) converts hyperlinks to a method used by a target web site. The proxy engine receives data from a web site (104) located across a network (102), and then determines whether additional data from the web site (104) is extractable. In response to determining that additional data from the web site (104) is extractable, the proxy engine (108) creates at least one synthetic hyperlink for extracting the data from the web site (104). The proxy engine (108) then combines the at least one synthetic hyperlink with the data received from the website (104) to create combined data and then sends the combined data to the crawler (100).

20 Claims, 9 Drawing Sheets

METHOD AND SYSTEM FOR EXTENDING THE PERFORMANCE OF A WEB CRAWLER

BACKGROUND OF THE INVENTION

1. Field of the Invention

This invention generally relates to the field of search engine technology, and more particularly relates to crawlers, robots, and spiders, and to a method of improving the performance of a crawler based search engine using a proxy type device to modify hyperlink requests and HTML pages.

2. Description of Related Art

Currently, searches on the Internet, and more specifically on the World Wide Web, are performed by users using a number of commercial search engines. These search engines are accessed at various web sites maintained by the operators of the search engines. Typically, to perform a search the user will enter terms to be searched into a form, and may also make selections from pull-down menus and checkboxes, to enter a search request on a search engine's web site. Then, the search engine will return a listing of web sites that contain the entered terms.

Search engines perform many complex tasks which can be generally categorized as front-end and back-end tasks. For example, when the user enters the terms and executes a search, the search engine service does not immediately search the Internet or World Wide Web for web sites containing data matching the search terms. This method would be slow and cumbersome given the huge number of web site that must be searched in order to find potential matches. Instead, the search engine service will search its own internal database of cataloged terms and corresponding web sites to find matches for the entered terms. The process of accepting the user's input, searching the internal database, and displaying the results for the user would be examples of front end tasks.

However, the search engine must perform back-end tasks unseen by the user in order to create and maintain its database of terms and corresponding web sites. These back-end tasks include searching for common terms on the Internet or World Wide Web, and cataloging their locations in the search engine's internal database so that the data can be provided quickly and efficiently to users in response to a search request.

Among the devices used by search engines to find data on the Internet and the World Wide Web are robots, crawlers, and spiders. Crawlers, spiders, and robots all work in a similar manner. These devices start by issuing a hyperlink request to a web site of interest. A hyperlink request contains a Uniform Resource Locator, or URL which indicates the address to a particular web page containing data. In response to the hyperlink request, the web site will send data back to the crawler. This data may be Hyper Text Markup Language pages, known as HTML pages, or other documents. Once the crawler has received an HTML page, it will look for other hyperlinks contained within the HTML page itself. These new hyperlinks will be indexed and cataloged in the search engines database. Then the crawler will follow the new hyperlinks and repeat the process, collecting more hyperlinks.

One significant limitation with current crawlers is that they only detect and follow static hyperlinks. Static hyperlinks are links in which the entire URL is plainly visible in the HTML page and easily extractable by the crawler. Some examples would include URLs such as "http://www.uspto.gov" generally following an HTML tag. HTML tags are commands written in the HTML language. Static tags would include "<A>" anchor tags, "<IMG>" image tags, and "<FRAME>" child frame tags among others. Thus, the crawler will look for URLs following these tags, and extract them from the HTML document for further processing.

However, the content on the Internet and World Wide Web that is accessible through static hyperlinks is dwarfed by the volume of content accessible via non-static hyperlinks such as those constructed from HTML forms. For example, many web pages contain a form requiring the user to enter either a selection or a keyword, and also the user may make selections via pull-down menus, checkboxes, and other selectable items. The user enters search terms and other parameter values, collectively referred to herein as parameter values, into a search engine in a web site, such as by utilizing any of the above mentioned mechanisms. In response to an input by the user, the web site will return additional data which may be in the form of an HTML page or other documents. Since existing crawlers are unable to supply this selection or keyword to the HTML form, the crawler can not reach this additional data.

Similarly, many web sites require the use of a client side script. For instance, many web sites keep track of users who visit the site by requiring a user's identification, sometime known as a user name. Similarly, a web site may require other information such as cookies, session identifiers, catalog names, and shopping cart identifiers to name a few. Typically, this information is combined with the user's own input to the form or selection by the use of a client-side script. A client-side script is basically a set of instructions that are executed by the user's computer. Examples of such scripting languages are VBScript and JavaScript. For example, when a user visits a web site and enters data in a form, if the web site requires a user identification, a JavaScript program can intercept the request and piggyback the request with the user identification and additional information. Many web sites will not allow a user to access areas of the web site without this information. Since existing crawlers do not have the capability to handle these requests for information, they are precluded for searching the content deeper on that web site, resulting in extracting of less data and hyperlinks than possible.

Therefore a need exists to overcome the problems with existing crawlers, as discussed above, in order to access a larger amount of potentially important data on the Internet and the World Wide Web.

DESCRIPTION OF THE PREFERRED EMBODIMENTS

According to a preferred embodiment of the present invention, a proxy engine, as will be discussed in detail below, overcomes problems with the prior art by providing a method and system for extending the performance of existing web crawlers. The present invention allows existing crawlers access to data on web sites that is currently unavailable to conventional crawling techniques. In contrast to requiring an entirely new crawler design, the present invention can be used with existing crawlers to improve their performance, requiring no changes to these existing crawlers. In accordance with the preferred embodiment, the Crawler 100 will preferably be unaware that any modification to hyperlink requests are being performed, but will be able to access data deep within web sites that currently is ignored by conventional crawler methods.

Figure 1:
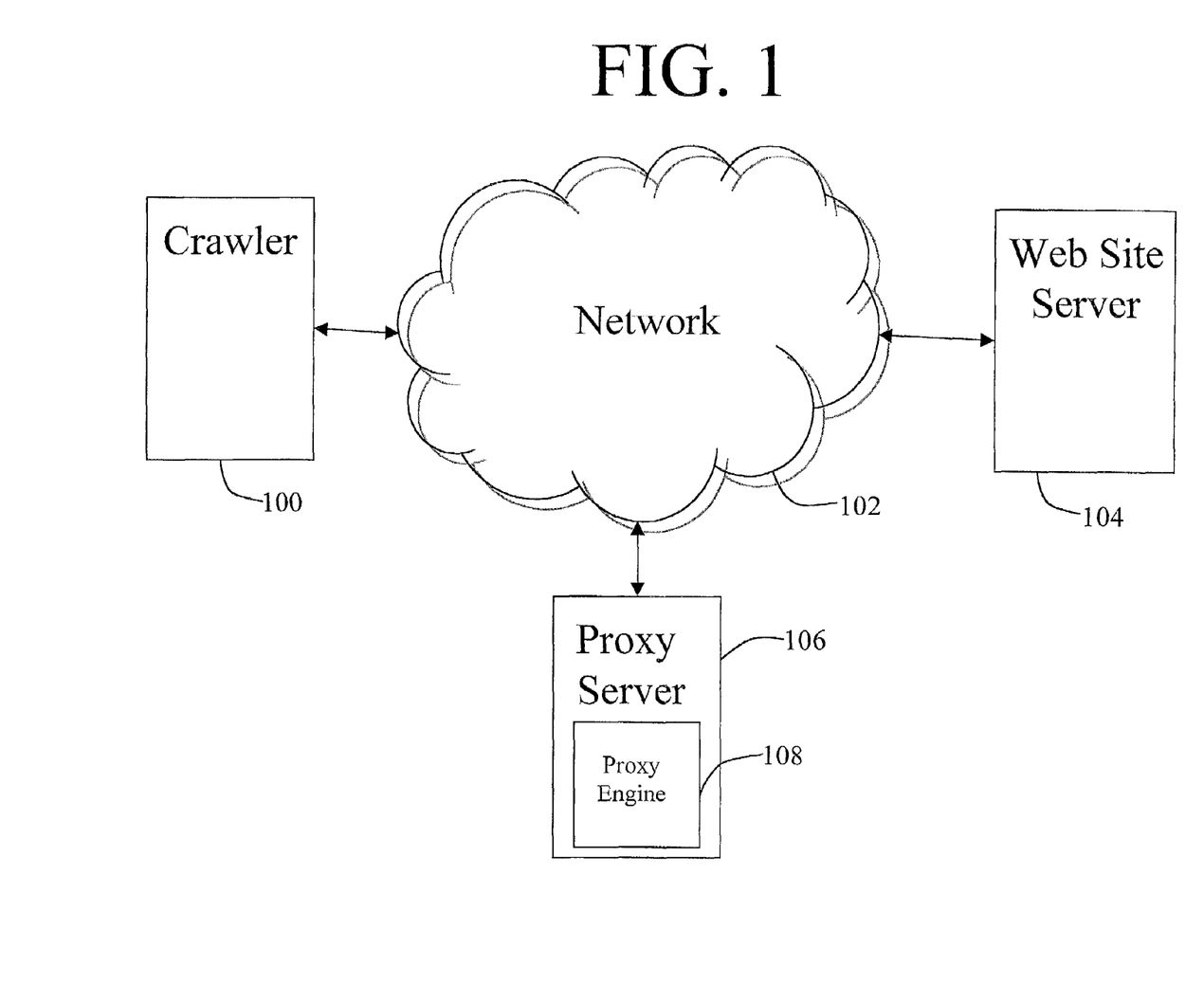
FIG. 1 is a system block diagram of a communication system for improving the performance of existing web crawlers in accordance with a preferred embodiment of the present invention.

According to a preferred embodiment of the present invention, as shown in FIG. 1, a system for extending the performance of a crawler includes a Proxy Server 106 connected through a Network 102 to a Crawler 100 and a Web Site Server 104. The Network 102 comprises a system of communication connections, such as via a local area network and/or a wide area network, and using any media such as wired, optical, wireless, or otherwise. Additionally, the Network 102 can comprise a collection of networks, such as utilized in the Internet. The Web Site Server 104 comprises a computing system implementing a server for a web site that contains HTML pages, documents, and other data of interest to the Crawler 100.

In the exemplary embodiment shown in FIG. 1, a Proxy Engine 108 is located in a Proxy Server 106. The Proxy Server 106 comprises a networked computing system communicatively coupled to the Network 102 and that implements the Proxy Server 106 functions and features as will be discussed in more detail below. The computing system of the Proxy Server 106 executes computer instructions required by the Proxy Server 106 functions and features and for communicating with the Network 102. The Proxy Engine 108 will be more fully discussed in detail below.

Figure 2:
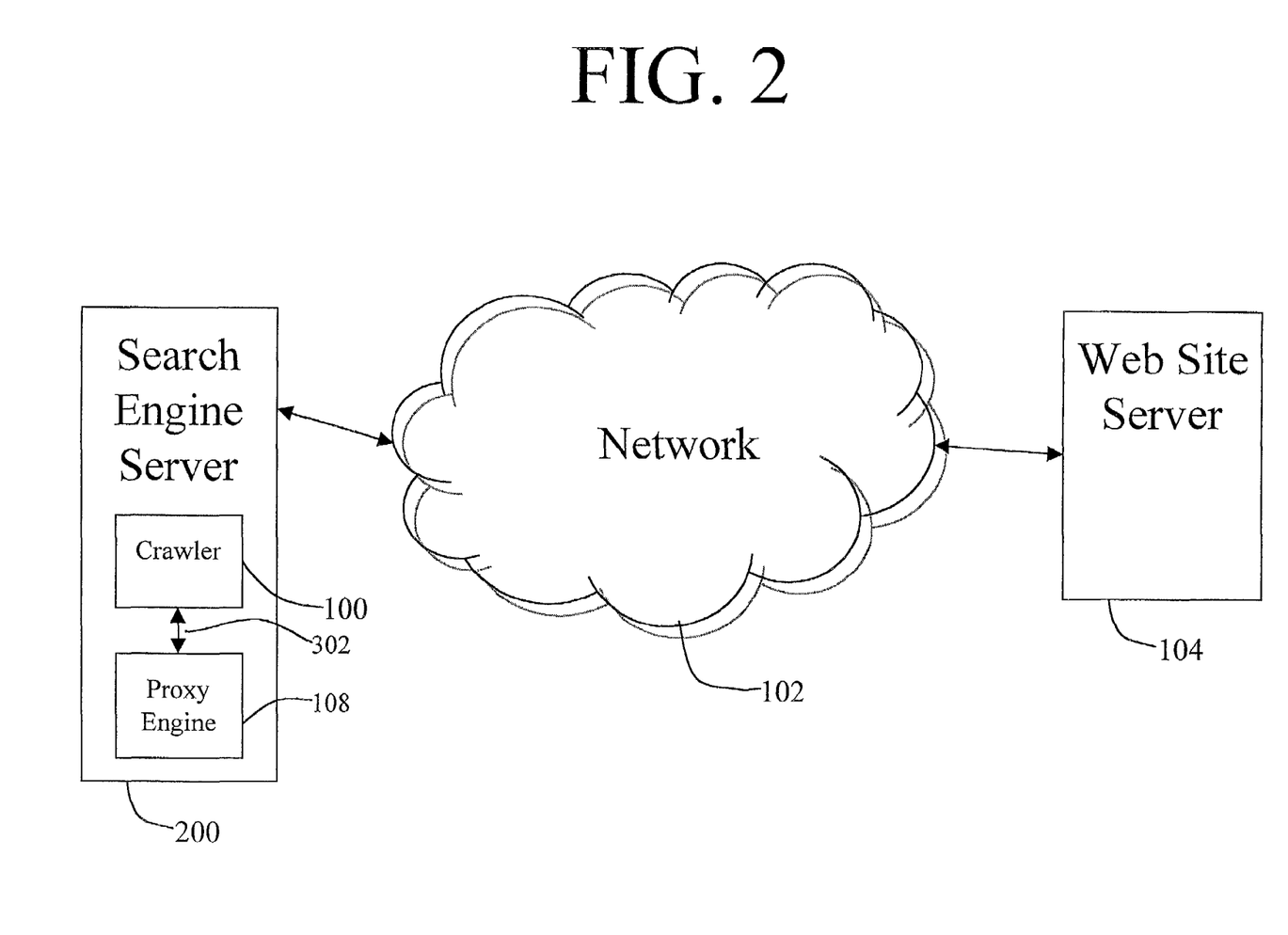
FIG. 2 is a system block diagram of a communication system for improving the performance of existing web crawlers according to an alternative preferred embodiment of the present invention.

The Crawler 100, in this example, is a conventional existing crawler that performs searches for hyperlinks and other data on one or more web sites accessible via at least one Web Site Server 104. The Crawler 100 is implemented on a computing system that is communicatively coupled to the Network 102. The computing system platform for the Crawler 100 executes computer instructions required by the Crawler 100 functions and features and for communicating with the Network 102. In an alternative embodiment, as shown in FIG. 2, the Crawler 100 of FIG. 1 is replaced by a Search Engine Server 200. In this example of an alternative embodiment of the present invention, a networked computing system platform for the Search Engine Server 200 encompasses the functions and features of both the Crawler 100 and the Proxy Server 106 as depicted in FIG. 1. Therefore, in the embodiment shown in FIG. 2, the Proxy Engine 108 resides on the same computing system platform as the Crawler 100. Further, the Proxy Engine 108 is communicatively coupled to the Crawler 100, such as via a communication interface 302 in the computing system platform.

Figure 3:
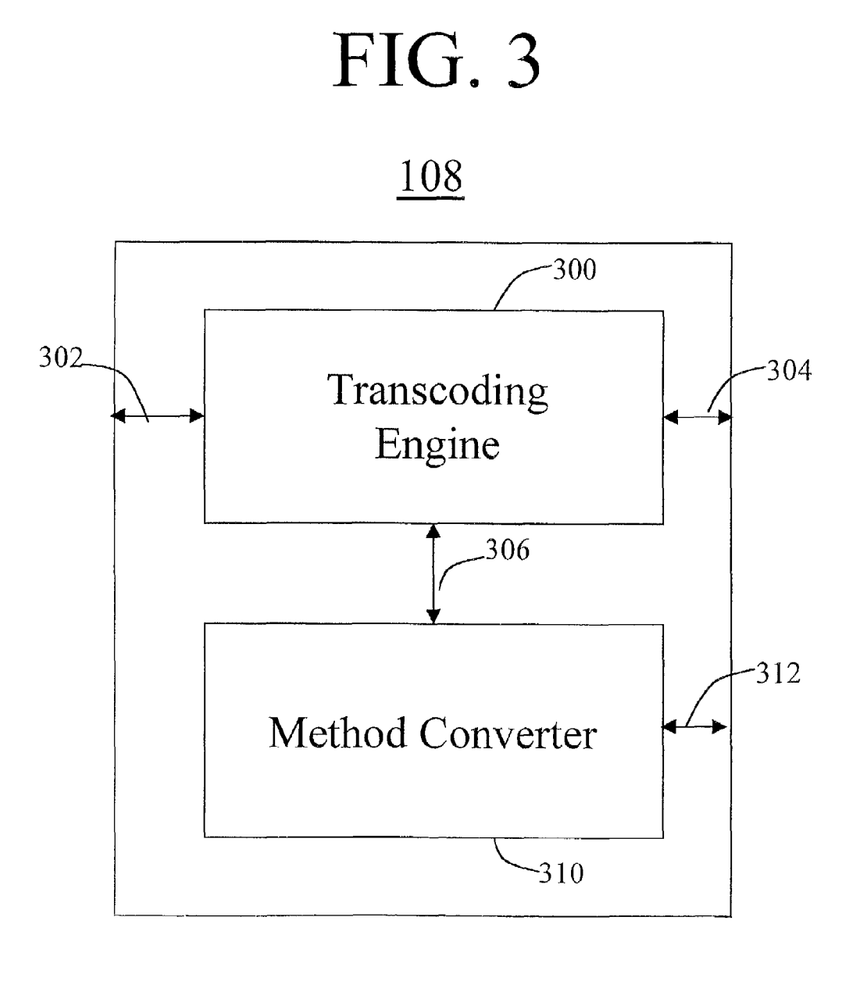
FIG. 3 is a functional block diagram depicting a Proxy Engine in accordance with a preferred embodiment of the present invention.

FIG. 3 shows a more detailed view of the Proxy Engine 108. Here the Proxy Engine 108 is shown as employing two devices, a Transcoding Engine 300 and a Method Converter 310. The Transcoding Engine 300 maintains a bi-directional communication link via the communication interface 302 with the Crawler 100 to receive hyperlink requests from the Crawler 100 and send data including HTML pages and other documents back to the Crawler 100. Recall that in the embodiment shown in FIG. 1, the communication interface 302 communicates over the Network 102 with the Crawler 100. However, in the embodiment shown in FIG. 2, the communication interface 302 is communicatively coupled with the Crawler 100 in the computing system platform supporting both the Crawler 100 and the Proxy Engine 108.

Additionally, the Transcoding Engine 300 maintains a second bi-directional communication link via a second communication interface 304 over the Network 102 with the Web Site Server 104. The second communication interface 304 is used to send hyperlink requests to the Web Site Server 104 and receive data including HTML pages and other documents from the Web Site Server 104. The Transcoding Engine 300 also maintains a bi-directional communication interface 306 internal to the Proxy Engine 108 to send hyperlink requests from the Transcoding Engine 300 to the Method Converter 310 and to receive data including HTML pages and other documents from the Method Converter 310. Finally, the Method Converter 310, also includes a bi-directional communication interface 312 to communicate via the Network 102 with at least one Web Site Server 104. This communication interface 312 is used by the Method Converter 310 to send hyperlink requests to a Web Site Server 104 and receive data including HTML pages and other documents from the Web Site Server 104. The Method Converter 310, according to a preferred embodiment of the present invention, converts a GET method hyperlink request to a POST method hyperlink request, and handles POST method hyperlink request communications with the Web Site Server 104. For example, the resulting data sent from the Method Converter 310 to the Web Site Server 104 would be a single HTTP request. Contained within that request would be a single static hyperlink. Also contained in that request, separate from the hyperlink, would be additional data that would normally be included in a GET method hyperlink. The Web Site Server 104 that requires a POST method hyperlink request will receive such data in the POST method hyperlink request and then respond to the Method Converter 310 with data, such as HTML pages and other documents. A method conversion proxy function, via the Method Converter 310, typically receives a GET method hyperlink request, then the Method Converter 310 extracts the "url" parameter of the request, and further extracts the CGI parameters encoded in the request, and connects to the Web Site Server 104 that is indicated by the "url" parameter. Then, after connecting, the Method Converter 310 passes the CGI parameters to the Web Site Server 104 using the POST method, and receives the Web Site Server 104 response. The response is then passed on to the Transcoding Engine 300. The Transcoding Engine 300 processes the response data and then sends the data, such as in an HTML page document and/or other documents, back to the Crawler 100.

Figure 4:
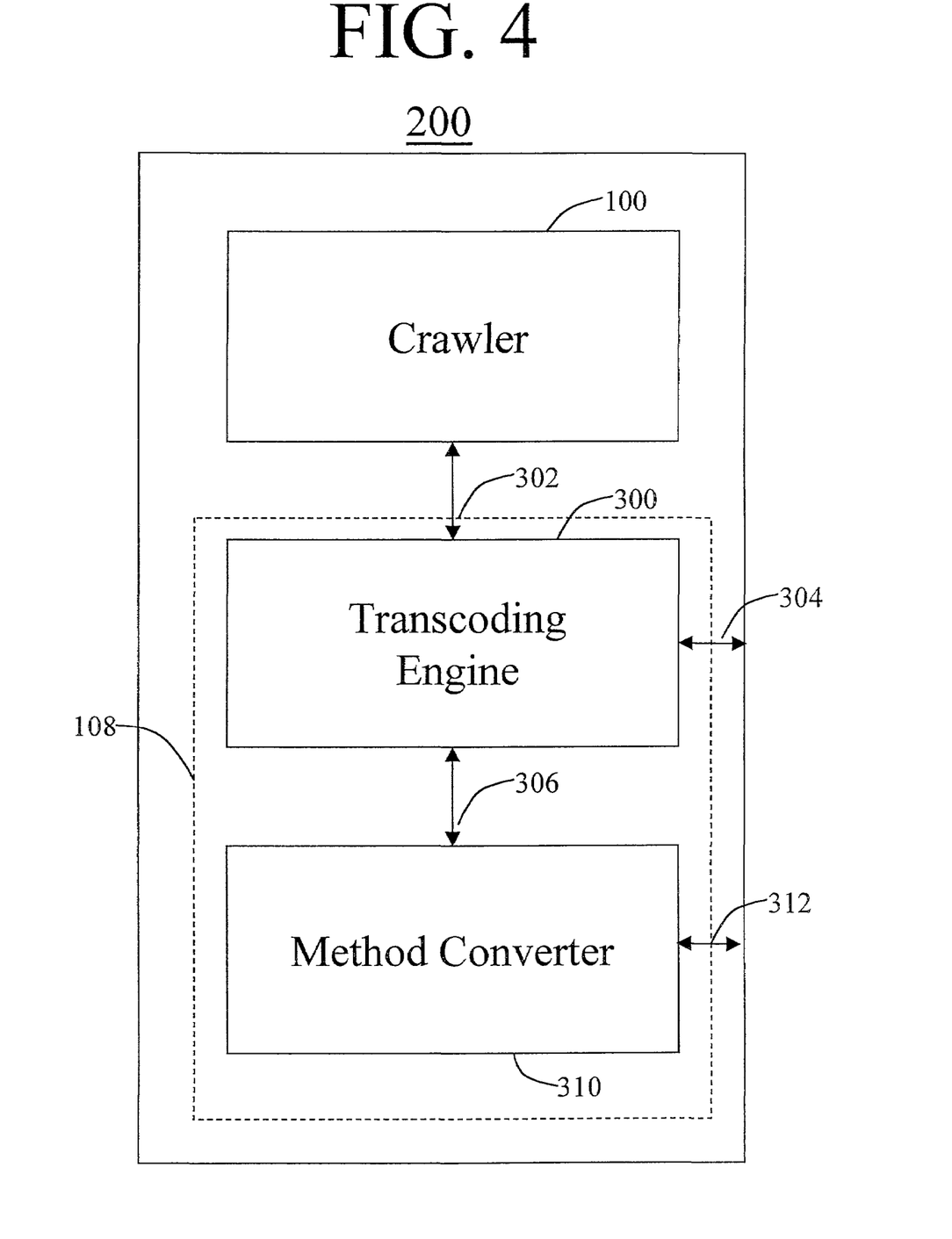
FIG. 4 is a functional block diagram illustrating a more detailed view of the Search Engine Server shown in FIG. 2, according to a preferred embodiment of the present invention.

As shown in FIG. 4, an alternative preferred embodiment of the present invention contemplates the Proxy Engine 108 residing on the same computing system platform or at the same location as the Crawler 100. In contrast to the embodiment shown in FIG. 1 where the Proxy Engine 108 communicates with the Crawler 100 across the Network 102, in this alternative embodiment the Search Engine Server 200 includes the Crawler 100 and the Proxy Engine 108, such as on the same networked computing system. Therefore, the communication interface 302 used by the Transcoding Engine 300 to communicate with the Crawler 100 is internal to the Search Engine Server 200 without accessing the Network 102. According to a preferred embodiment of the present invention, this interface 302 comprises an inter-application communication interface, such as supported in modern operating systems, to allow a first application, such as the Proxy Engine 108, to communicate with a second application, such as the Crawler 100, both applications being hosted on the same computing system platform of the Search Engine Server 200. The communication interface 302 normally receives hyperlink requests from the Crawler 100 and sends data, including HTML pages and other documents, back to the Crawler 100.

Figure 5:
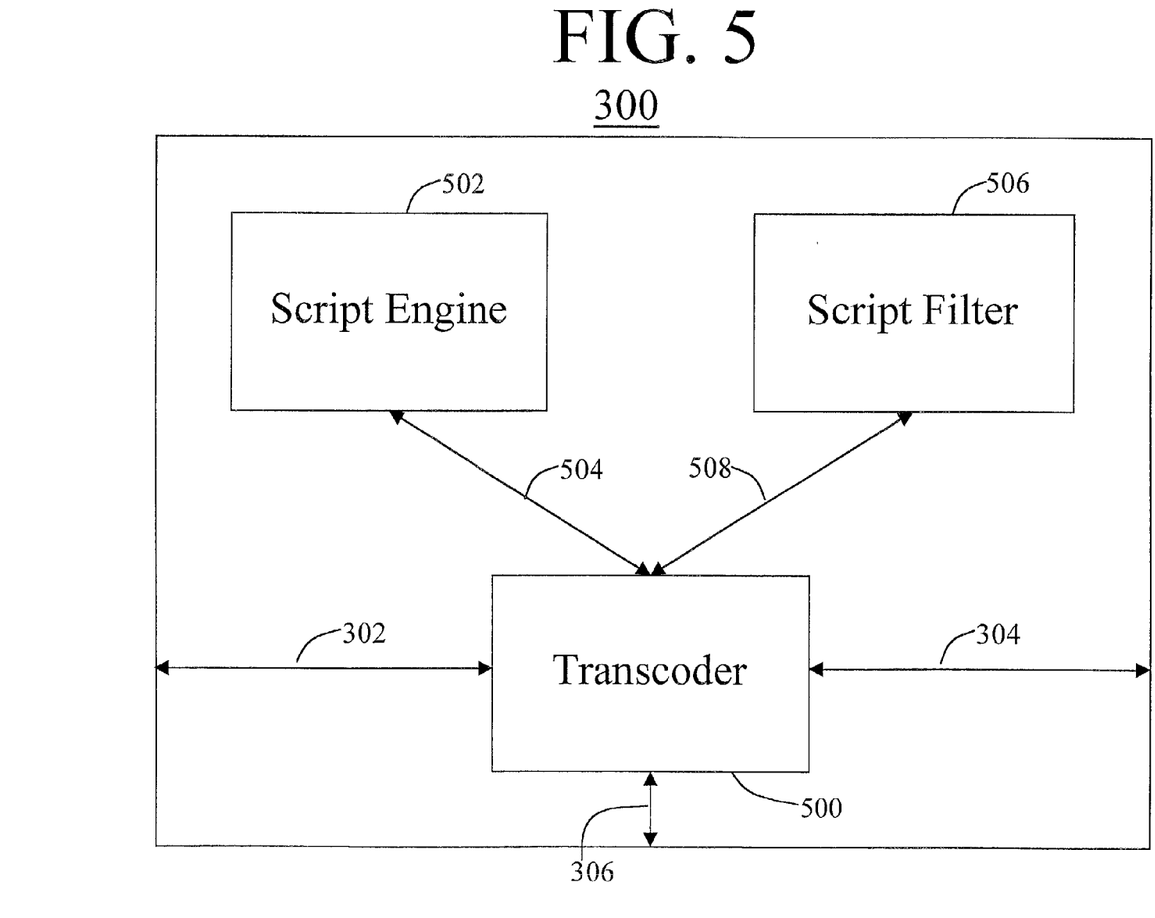
FIG. 5 is a functional block diagram illustrating a more detailed view of the Transcoding Engine shown in FIGS. 3 and 4, in accordance with a preferred embodiment of the present invention.

As depicted in FIG. 5, the Transcoding Engine 300 includes a Transcoder, 500, and either a Script Engine 502, a Script Filter 506, or both. The Script Engine 502 maintains a bi-directional communication interface 504 with the Transcoder 500 internal to the Transcoding Engine 300 to receive requests to execute scripts, and return parameter values to the Transcoding Engine 300. According to a preferred embodiment of the present invention, the Script Engine 502 takes a list of synthetic hyperlinks produced by the Transcoder 500 plus a script code that is defined in an HTML page. For each hyperlink, the Script Engine 502 executes functions of the script code and produces an output. This output may be identical to or different from the original synthetic hyperlink, depending on the actions of the script code. The modified set of hyperlinks is returned to the Transcoder 500.

In similar fashion to the communication with the Script Engine 502, the Script Filter 506 maintains a bi-directional communication link 508 with the Transcoder 500 internal to the Transcoding Engine 300. This bi-directional communication link 508 is used to send requests to the Script Filter 506 to generate parameter values to be sent back to the Transcoder 500. The Script Filter 506 handles script code of at least one particular Web Site Server 104. The Script Filter 506 analyzes the script code of an HTML page and performs the actions described in the script code without actually executing them in a script engine. This analysis is preferable over actual execution of script code in certain situations. For example, it may be preferable to analyze script code when
a) execution would be slow, such as due to a very large amount of script code, or
b) the script engine is not able to execute the script code due to incompatibility with the script language version, or c) if the script engine is not available. The Script Filter 506 accepts as input a set of synthetic hyperlinks generated by the Transcoder 500, plus the script code defined in an HTML page. For each hyperlink, the Script Filter 506 performs a computation defined by one or more filters to output a modified set of hyperlinks. The modified set of hyperlinks is then returned to the Transcoder 500.

Figure 6:
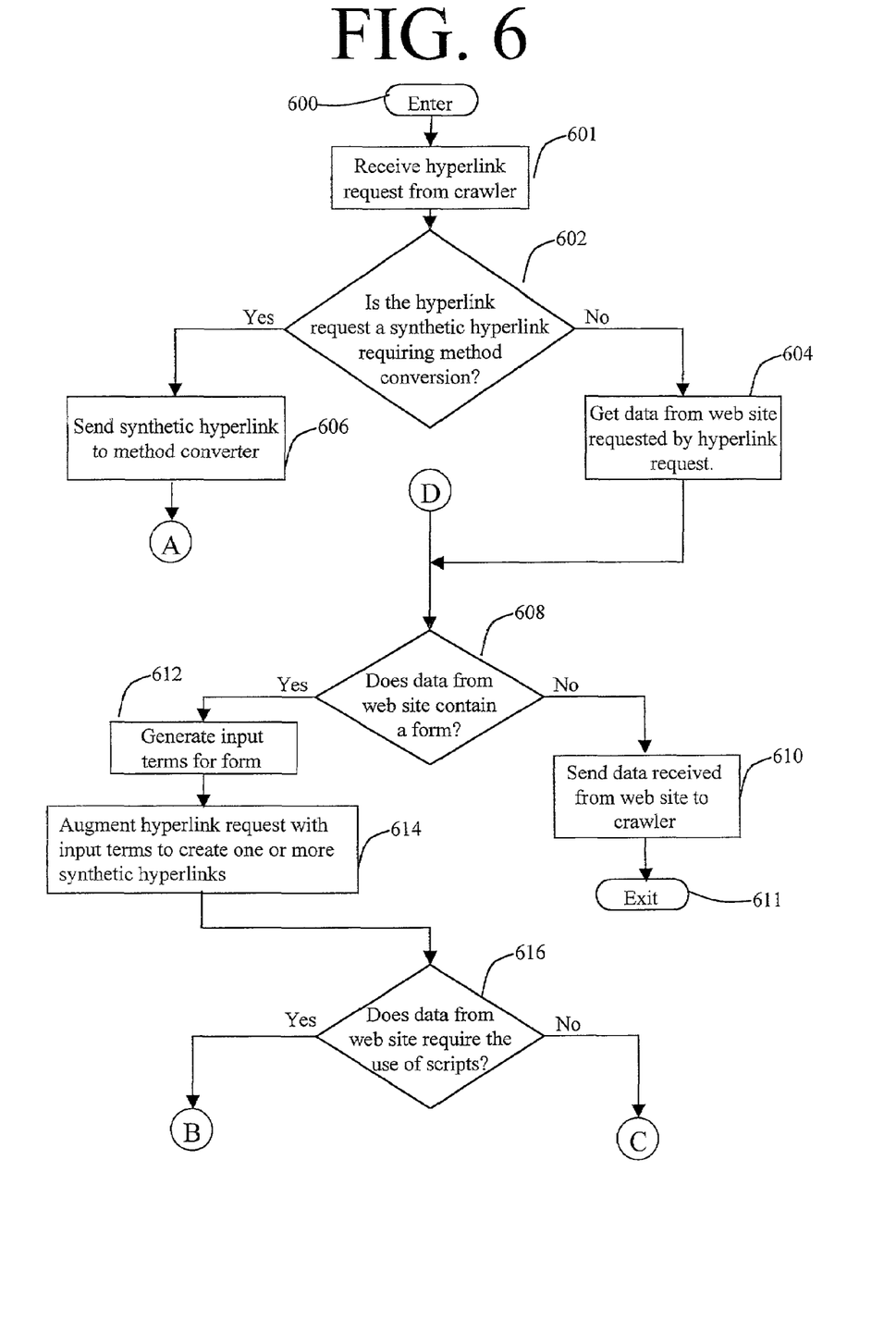
FIGS. 6, 7, 8, and 9 comprise a flow diagram illustrating an operational sequence performed by the Proxy Engine shown in FIGS. 3 and 4, in accordance with a preferred embodiment of the present invention.
Figure 7:
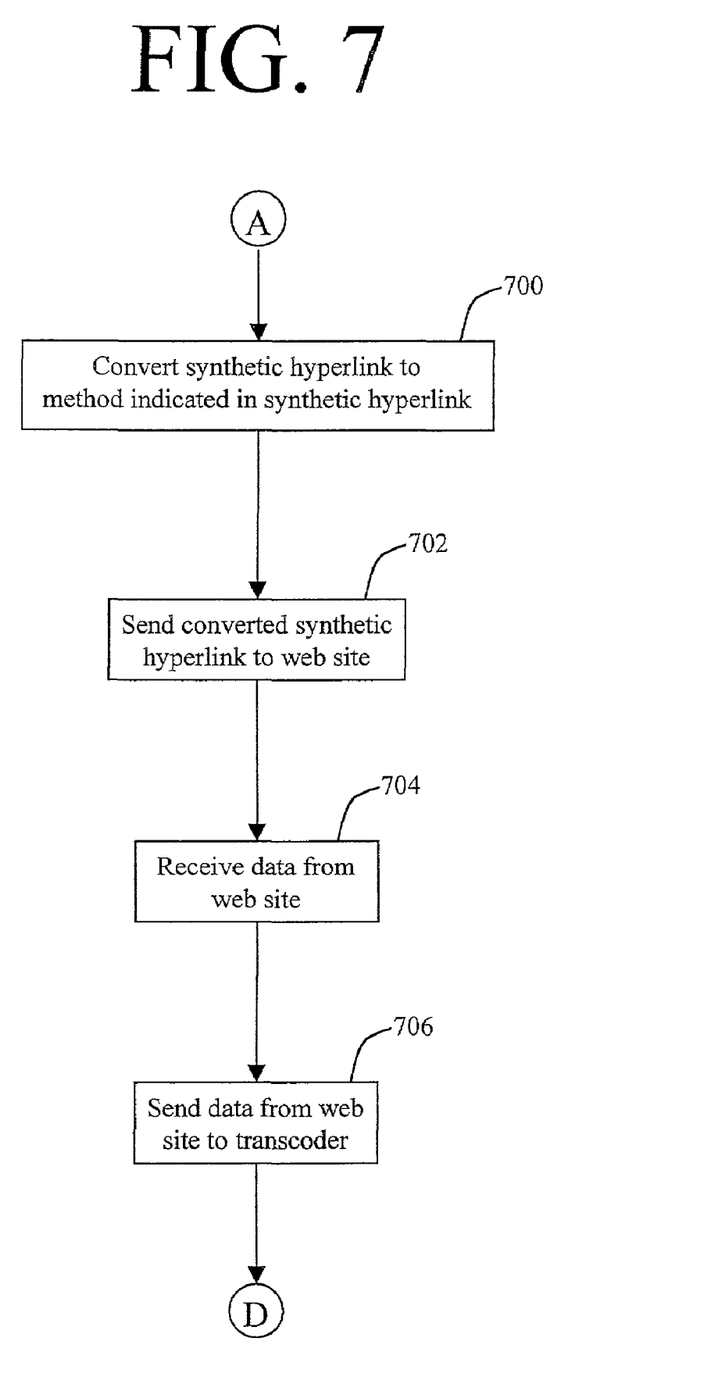
Figure 8:
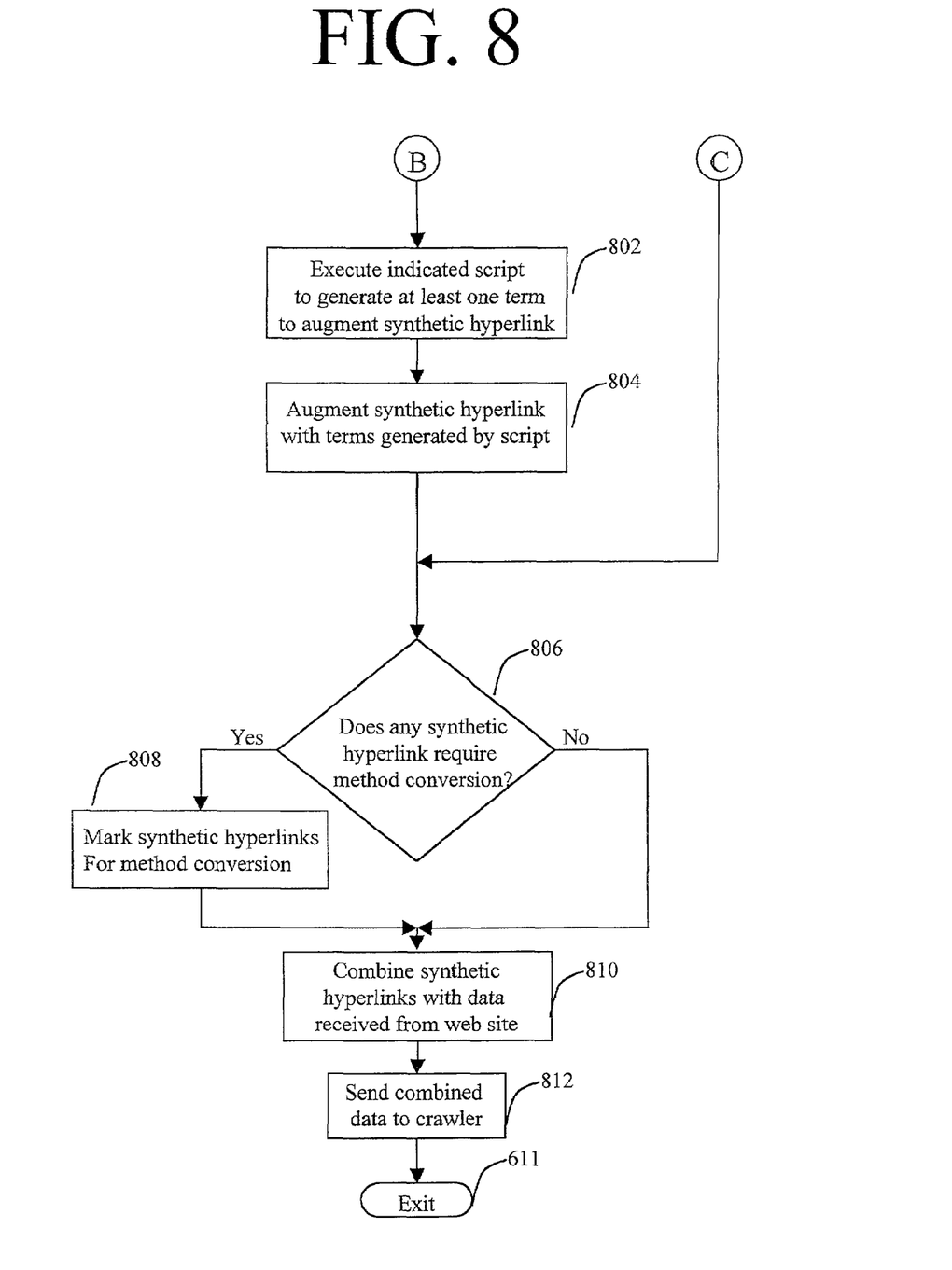
Figure 9:
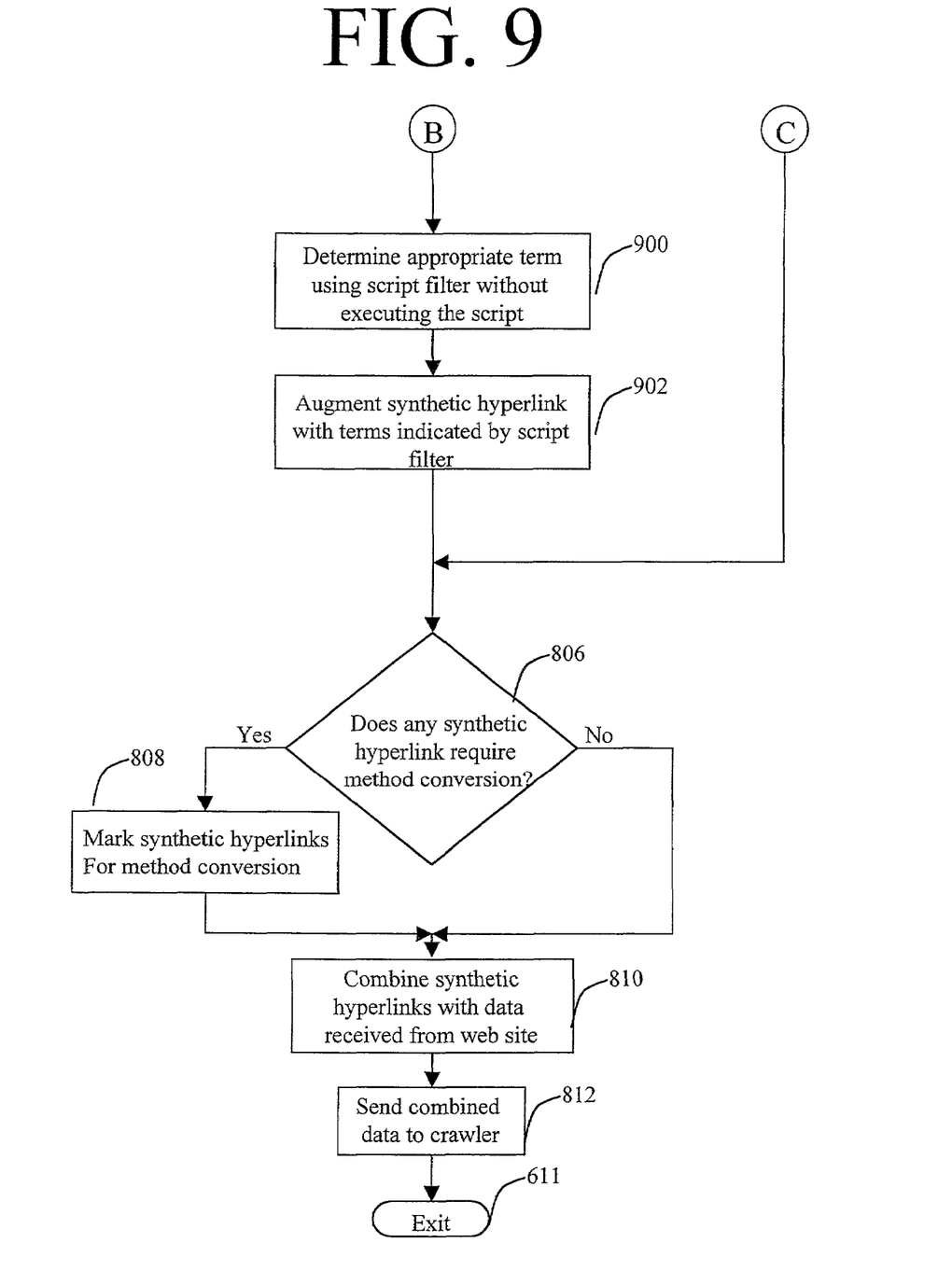

The general operation of the Proxy Engine 108 according to a preferred embodiment of the present invention is illustrated in FIGS. 6 through 9. FIG. 6, and continuing on FIG. 8 and FIG. 9, comprises functions of the Transcoding Engine 300. FIG. 8 illustrates exemplary functions of the Script Engine 502. FIG. 9 shows functions of the Script Filter 506. FIG. 7 comprises exemplary functions of the Method Converter 310.

Referring to FIG. 6, the Transcoding Engine 300 receives a hyperlink request from the Crawler 100, at step 600. The hyperlink request may comprise a static hyperlink and/or a synthetic hyperlink. Synthetic hyperlinks are hyperlinks that have been created by the Transcoder 500 and inserted into an HTML page that are sent back to the Crawler 100. Upon receiving the hyperlink request, the Transcoder 500 determines whether the hyperlink is a synthetic hyperlink requiring method conversion, at step 602. If the hyperlink requires method conversion, the Transcoder 500 will have specially marked the synthetic hyperlink before inserting the synthetic hyperlink into an HTML page and sending it back to the Crawler 100. Synthetic hyperlinks marked for method conversion will be sent to the method converter, at step 606, via the communication interface 306.

If the hyperlink or synthetic hyperlink does not require method conversion, it is sent to a Web Site Server 104 across the Network 102. In response to locating the web site indicated by the hyperlink or synthetic hyperlink request, the Web Site Server 104 will send the first page or document, at step 604, to the Transcoder 500 via the communication interface 304. The Transcoder 500 will then analyze the data returned from the web site. If the data is a document other than an HTML page, the document will be sent directly to the Crawler 100 via the communication interface 302. If the data is an HTML page, the Transcoder will determine whether the web site uses any form inputs from analyzing the HTML page, at step 608. If there are no form inputs indicated in the HTML page, the data received from the web site is sent back, at steps 610, 611, to the Crawler 100 and exiting the transaction until a further hyperlink request is sent to the Transcoder 500.

Recall that many web pages contain a form requiring a user to enter either a selection or a keyword, and also a user may make selections via pull-down menus, checkboxes, and other selectable items. The user can enter search terms and other parameter values, collectively referred to herein as parameter values, into a search engine in a web site, such as by utilizing any of the above mentioned mechanisms. In response to an input by the user, the web site will return additional data which may be in the form of an HTML page or other documents.

If the Transcoder 500 determines that the HTML page contains a form, it will generate parameter values for the form, at step 612. A form input can be implemented in a number of ways. For instance, some web sites allow a user to make a selection of a number of choices. These would be indicated on the HTML page by the use of the HTML tag "<INPUT>", "<OPTION>" or "<SELECT>" followed by various choices. The Transcoder 500 can examine the HTML page for these tags and the various choices following the tags. In this way, the Transcoder 500 can determine appropriate parameter values to be used in the form on the HTML page.

Similarly, a form may be implemented as a box for text entry by the user. One method of indicating the use of a text entry on the HTML page is by the use of the HTML tag "<INPUT TYPE=TEXT>". If the Transcoder 500 detects use of this HTML tag, it will look for a default text value in the HTML page and it will use this text value as an appropriate parameter value. If the Transcoder 500 can not find a default value, it will generate parameter values, at step 612, to be used for creating the synthetic hyperlinks using the individual letters A through Z, the individual numbers 0 through 9, and other values selected from a list of common nouns.

After generating parameter values for any forms, the Transcoder 500 will augment the hyperlink request with the parameter values, creating one or more synthetic hyperlink, at step 614. Furthermore, script analysis is performed in conjunction with the HTML form analysis. The Transcoder 500 first determines if the HTML page contains a script, at step 616, such as a Java Script. If no scripts are present in the HTML page, the Transcoder must determine if the synthetic hyperlink requires method conversion, at step 806, as shown in FIG. 8 and in FIG. 9.

When a form is used on a web site, a user's input is transmitted to the web site using several different methods. Two typical methods are the GET and POST methods. When a GET method is used, the hyperlink is constructed by the user's browser wherein the hyperlink is a combination of the base URL and the user's input. In contrast, when using a POST method, the base URL and the user's input will be transmitted separately. Since most existing crawlers can only handle the GET method, synthetic hyperlinks destined for web sites using the POST must be converted to the POST method. To indicate to the Transcoder 500 which synthetic hyperlinks require conversion, the Transcoder 500 must decide which synthetic hyperlinks require conversion, at step 806, and specially mark those hyperlinks, at step 808. After the synthetic hyperlinks that require conversion are marked, the synthetic hyperlinks are combined with the data from the web site, at step 810. Generally, the synthetic hyperlinks are inserted into the HTML page from the web site. Finally, the combined data is sent back to the crawler, at step 812, for further processing.

If, however, the Transcoder 500 determines that there are scripts present in the HTML page, at step 616, the Transcoder will use one of several devices to generate parameter values required by the script. Two such devices are shown in FIG. 5: The devices are the Script Engine 502 and the Script Filter 506. An exemplary function of the Script Engine 502 according to the preferred embodiment of the present invention is shown in FIG. 8, where the Transcoder 500 invokes the use of a Script Engine 502. The Script Engine 502 will execute the script indicated in the HTML page, thereby generating parameter values required by the web site, at step 802. On the other hand, an alternative method of using a Script Filter 506 is shown in FIG. 9. In contrast to the Script Engine 502 one implementation of the Script Filter 506, in accordance with the preferred embodiment of the present invention, selects parameter values by consulting a list or table of appropriate values determined by examining the various script instructions on the HTML page, at step 900. These parameter values are selected without actually executing the script present in the HTML page.

After the parameter values have been determined by either the Script Engine 502 or the Script Filter 506, the synthetic hyperlink is augmented with the parameter values, at steps 804, 902. Accordingly, the Transcoder 500 decides which synthetic hyperlinks require conversion, at step 806, and specially marks those hyperlinks, at step 808. After the synthetic hyperlinks that require conversion are marked, the synthetic hyperlinks are combined with the data from the web site 810. Generally, the synthetic hyperlinks are inserted into the HTML page from the web site. Finally, the combined data is sent back to the crawler, at step 812, for further processing.

In a preferred embodiment of the present invention, when a hyperlink request is made by the Crawler 100, the Transcoder 500 determines whether the hyperlink request is a synthetic hyperlink and if it is marked for method conversion, at step 602. If a synthetic hyperlink requires method conversion, the Transcoder 500 sends the synthetic hyperlink to the Method Converter 310. Recall that the Transcoder 500 has already determined what method is used by the destination web site and has marked the synthetic hyperlink accordingly, at step 808. The Method Converter 310 converts the synthetic hyperlink to the method indicated in the synthetic hyperlink itself, at step 700. The synthetic hyperlink is then sent to the Web Site Server 104 using the method required by that web site, at step 702. In response to the synthetic hyperlink request, a Web Site Server 104 will return the requested data which is received, at step 704, at the Method Converter 310. Thereafter, the Method Converter 310 will send the data from the web site back to the Transcoder 500 for further processing. In a preferred embodiment of the present invention, further processing will begin with a determination of whether data from the web site contains a form, at step 608, as has been described above.

The Proxy Engine 108 can be realized in hardware, software, or a combination of hardware and software. A Transcoding Engine 300 and a Method Converter 310, as illustrated in FIG. 3 according to a preferred embodiment of the present invention, can be realized in a centralized fashion in one computer system, or in a distributed fashion where different elements are spread across several interconnected computer systems. Similarly, the invention consisting of an aforementioned Transcoding Engine 300 and a Method Converter 310 can be combined with the Crawler 100 on the same computing system platform, server, computer or other implementation as illustrated in FIG. 2, or they may be distributed across several interconnected computing systems, one such configuration being illustrated in FIG. 1.

Furthermore, any kind of computer system platform, or other apparatus adapted for carrying out the methods described herein, is suited for implementing the Proxy Engine 108, as will be anticipated by those of ordinary skill in the art in view of the discussion above. A typical combination of hardware and software could be a general-purpose computer system with a computer program that, when being loaded and executed, controls the computer system such that it carries out the new and novel methods described herein.

The Proxy Engine 108 can also be embedded in a computer program product, which comprises features and functions enabling the implementation of the new and novel methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising the steps of:
communicating with a website located across a network using a web protocol;
receiving data from the web site;
determining, at a location located across the network from the website, whether additional data from the web site is extractable;
in response to determining that additional data from the web site is extractable, creating at least one synthetic hyperlink for extracting the data from the web site;
combining the at least one synthetic hyperlink with the data received from the website to create combined data; and
sending the combined data to a crawler.

2. The method of claim 1, wherein the step of creating at least one synthetic hyperlink comprises the step of:
augmenting a hyperlink request with at least one parameter value appropriate for a form used by the web site to create at least one synthetic hyperlink.

3. The method of claim 1, wherein the step of creating at least one synthetic hyperlink comprises the step of:
augmenting a hyperlink request with at least one parameter value determined by executing a script contained in the data from the web site to create at least one synthetic hyperlink.

4. The method of claim 1, wherein the step of creating at least one synthetic hyperlink comprises the step of:
augmenting a hyperlink request with at least one parameter value determined by a script filter analyzing a script contained in the data from the web site to create at least one synthetic hyperlink.

5. The method of claim 1, wherein the step of creating at least one synthetic hyperlink comprises the step of:
augmenting a hyperlink request with at least one parameter value to create a synthetic hyperlink, the synthetic hyperlink indicating that it must be converted to a different method for extracting data from the web site.

6. The method of claim 1, wherein the web protocol is Hyper Text Transfer Protocol.

7. A method comprising the steps of:
receiving a synthetic hyperlink request;
converting the synthetic hyperlink request to a method indicated by the synthetic hyperlink request to create a converted hyperlink request; and
sending the converted hyperlink request to a web site located across a network using a web protocol.

8. The method of claim 7, wherein the step of converting the synthetic hyperlink request comprises the steps of:
determining whether the synthetic hyperlink request indicates the use of a POST method; and
in response to determining that the synthetic hyperlink request indicates the use of a POST method, converting the synthetic hyperlink from a GET method to a POST method.

9. A system comprising:
at least one communication device for communicating with a website located across a network using a web protocol and receiving data from the web site and sending data to a crawler; and
at least one computer processing device, located across the network from the web site and communicatively coupled to the at least one communication device, for analyzing data received from the web site to determine whether additional data is extractable from the web site by a hyperlink request,
creating at least one synthetic hyperlink for extracting data from the web site, and
combining the at least one synthetic hyperlink with data received from the web site in response to the hyperlink request.

10. The system according to claim 9, wherein the at least one computer processing device comprises:
a transcoder for
determining at least one parameter value for a form required by the data from the web site;
augmenting the hyperlink request with at least one parameter value to create the at least one synthetic hyperlink; and
combining the at least one synthetic hyperlink with the data received from the web site in response to the hyperlink request.

11. The system according to claim 9, wherein the at least one computer processing device comprises:
a transcoder, communicatively coupled to the at least one communication device, for
augmenting the hyperlink request with at least one parameter value to create the at least one synthetic hyperlink for each of the at least one parameter value, and
combining the at least one synthetic hyperlink with the data received from the web site; and
a script engine, communicatively coupled to the transcoder, for determining the at least one parameter value by executing a script contained in the data from the web site.

12. The system according to claim 9, wherein the at least one computer processing device comprises:
a transcoder, communicatively coupled to the at least one communication device, for
augmenting the hyperlink request with at least one parameter value to create the at least one synthetic hyperlink for each of the at least one parameter value, and
combining the at least one synthetic hyperlink with the data received from the web site; and
a script filter, communicatively coupled to the transcoder, for determining the at least one parameter value by analyzing the script contained in the data from the web site.

13. The system according to claim 9, wherein the at least one computer processing device comprises:
a transcoder for augmenting the hyperlink request with at least one parameter value to create the at least one synthetic hyperlink indicating that the at least one synthetic hyperlink must be converted to a different method for extracting data from the web site.

14. A system for extending the performance of a crawler comprising:
at least one communication device for receiving a synthetic hyperlink request and communicating with a website located across a network using a web protocol for sending data to the web site, in accordance with the synthetic hyperlink request; and
a method converter, communicatively coupled to the at least one communication device, for converting the synthetic hyperlink request to a method compatible with the web site.

15. The system of claim 14, wherein the method converter is for converting the synthetic hyperlink request from a GET method to a POST method.

16. A tangibly embodied computer readable medium including computer instructions for a computing system, the computer instructions comprising instructions for:
- communicating with a website located across a network using a web protocol;
- receiving data from the web site;
- determining, at a location located across the network from the website, whether additional data from the web site is extractable;
- in response to determining that additional data from the web site is extractable, creating at least one synthetic hyperlink for extracting the data from the web site;
- combining the at least one synthetic hyperlink with the data received from the web site to create combined data; and
- sending the combined data to a crawler.

17. The computer readable medium of claim 16, wherein the computer instructions for creating at least one synthetic hyperlink comprise instructions for augmenting a hyperlink request with at least one parameter value for a form used by the web site to create the at least one synthetic hyperlink.

18. The computer readable medium of claim 15, wherein the computer instructions for creating at least one synthetic hyperlink comprise instructions for augmenting a hyperlink request with at least one parameter value determined by executing a script contained in the data from the web site to create the at least one synthetic hyperlink.

19. A tangibly embodied computer readable medium including computer instructions for a computer system, the computer instructions comprising instructions for:
- receiving a synthetic hyperlink request;
- converting the synthetic hyperlink request to a method indicated by the synthetic hyperlink request to create a converted hyperlink request; and
- sending the converted hyperlink request to a web site located across a network using a web protocol.

20. A tangibly embodied computer readable medium including computer instruction for a computer system, the computer instructions comprising instructions for:
- receiving a synthetic hyperlink request for extracting data from a web site;
- converting the synthetic hyperlink request to a method indicated by the synthetic hyperlink request;
- in response to determining that the synthetic hyperlink request indicates the use of a POST method, converting the synthetic hyperlink request from a GET method to a POST method; and
- sending the converted hyperlink request to a web site located across a network using a web protocol.

* * * * *